(12) United States Patent
Newhouse

(10) Patent No.: US 8,928,469 B2
(45) Date of Patent: Jan. 6, 2015

(54) AUTOMATIC FUELING NOTIFICATION

(71) Applicant: Scott Newhouse, Denton, TX (US)

(72) Inventor: Scott Newhouse, Denton, TX (US)

(73) Assignees: PACCAR Inc, Bellevue, WA (US); Cummins Intellectual Property, Inc., Minneapolis, MN (US)

( * ) Notice: Subject to any disclaimer, the term of this patent is extended or adjusted under 35 U.S.C. 154(b) by 0 days.

(21) Appl. No.: 13/834,699

(22) Filed: Mar. 15, 2013

(65) Prior Publication Data

US 2014/0266650 A1 Sep. 18, 2014

(51) Int. Cl.
*B60Q 1/00* (2006.01)
*G01F 23/00* (2006.01)
*B60Q 9/00* (2006.01)

(52) U.S. Cl.
CPC .............. *G01F 23/0061* (2013.01); *B60Q 9/00* (2013.01)
USPC ..................................... 340/425.5; 340/450.2

(58) Field of Classification Search
USPC ................... 340/425.5, 450.2, 459
IPC ...... G01F 1/00,11/00, 17/00, 23/00; B60K 1/00
See application file for complete search history.

(56) References Cited

U.S. PATENT DOCUMENTS

| | | | |
|---|---|---|---|
| 3,909,779 A | 9/1975 | Snyder | |
| 3,987,671 A | 10/1976 | Monaghan | |
| 4,217,644 A | 8/1980 | Kato | |
| 5,765,435 A | 6/1998 | Grötschel | |
| 6,484,088 B1 | 11/2002 | Reimer | |
| 6,571,626 B1 | 6/2003 | Herford | |
| 6,615,656 B1 | 9/2003 | Breed | |
| 6,691,025 B2 | 2/2004 | Reimer | |
| 6,907,371 B2 | 6/2005 | Klinger | |
| 6,940,401 B2 | 9/2005 | Taxon | |
| 7,024,317 B1 | 4/2006 | George | |
| 7,999,664 B2 | 8/2011 | Barajas | |
| 2002/0189707 A1* | 12/2002 | Enge | 141/105 |
| 2010/0063717 A1* | 3/2010 | Proefke et al. | 701/123 |
| 2010/0238013 A1 | 9/2010 | Grothaus | |
| 2011/0238457 A1 | 9/2011 | Mason | |

OTHER PUBLICATIONS

Falvey, K., "Green Marine Fuel Whistle: Top Off Your Tank Safely," Boating Magazine, published online as early as Jul. 3, 2011, <http://www.boatingmag.com/gear/marine%20accessories/green-marine-fuel-whistle>, 2 pages.
"Fuel Whistle: Never Overfill Your Tank Again!" (Product Information), Green Marine Products, Bayville, N.Y., as early as Jul. 3, 2011, <http://www.greenmarineproducts.com/fuel-whistle/> [retrieved Jun. 28, 2013], 2 pages.

* cited by examiner

*Primary Examiner* — Shirley Lu
(74) *Attorney, Agent, or Firm* — Christensen O'Connor Johnson Kindness PLLC

(57) ABSTRACT

A system that notifies the operator, during refueling, when the fuel tank of a vehicle has been filled to contain a predetermined amount. The predetermined amount may include but is not limited to a full condition, an amount that is calculated to satisfy a specific trip, etc. The system may include one or more fuel sensors that can detect conditions of the fuel delivery system, such as the quantity of fuel residing in the tank. The system further includes a controller and an output device. During a refill event, the controller receives the data from the one or more sensors, processes the data, and causes the output device to notify the operator when the tank is filled with the predetermined amount of fuel. The notification can be audible, such as the horn honking, visual, such as lights flashing, or tactile, such as the vehicle seat vibrates.

15 Claims, 4 Drawing Sheets

AUTOMATIC FUELING NOTIFICATION

BACKGROUND

Conventional engine powered vehicles include a fuel tank and a fuel delivery system that delivers fuel from the fuel tank to the engine during its operation. Once the fuel in the fuel tank runs out, the fuel tank is in need of refueling. Alternatively, the fuel tank can be refilled when the fuel tank drops below a "full" tank.

Fuel spills when refueling a vehicle can at least cause extraneous clean-up, and at most, cause a hazardous condition. Conventional refueling systems employ nozzles that shut off as a result of pressure in the fill neck indicating a "full" tank. However, not all refueling systems employ "auto" shut-off nozzles. For example, many refueling stations in the marine environment prohibit the use of "auto" shut off nozzle. In addition, some users only wish to fill the fuel tank with a certain quantity of fuel. However, the only way currently to accomplish this goal is to continually watch the meter of the fuel pump, and stop the fuel nozzle when the desired amount has been added to the tank.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a system is provided for notifying a user of a condition during refueling of a vehicle. The system includes an output device configured to produce a user notification, a liquid reservoir, one or more sensors associated with the liquid reservoir, wherein the one or more sensors are configured to generate data indicative of the quantity of liquid in the liquid reservoir, and a controller configured to receive the data from the one or more sensors during refill of the liquid reservoir, determine the quantity of liquid in the liquid reservoir, and cause the output device to produce the notification when the quantity of liquid has exceeded a predetermined threshold.

In accordance with another aspect of the present disclosure, a method is provided for notifying a user of a condition during refueling of a vehicle. The method includes receiving data indicative of fuel level in a fuel tank, obtaining a value indicating a predetermined threshold quantity of fuel, determining the quantity of fuel in the fuel tank during refueling, and outputting a notification signal in response to the determined quantity of fuel being equal to or greater than the value indicating a predetermined threshold quantity of fuel.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
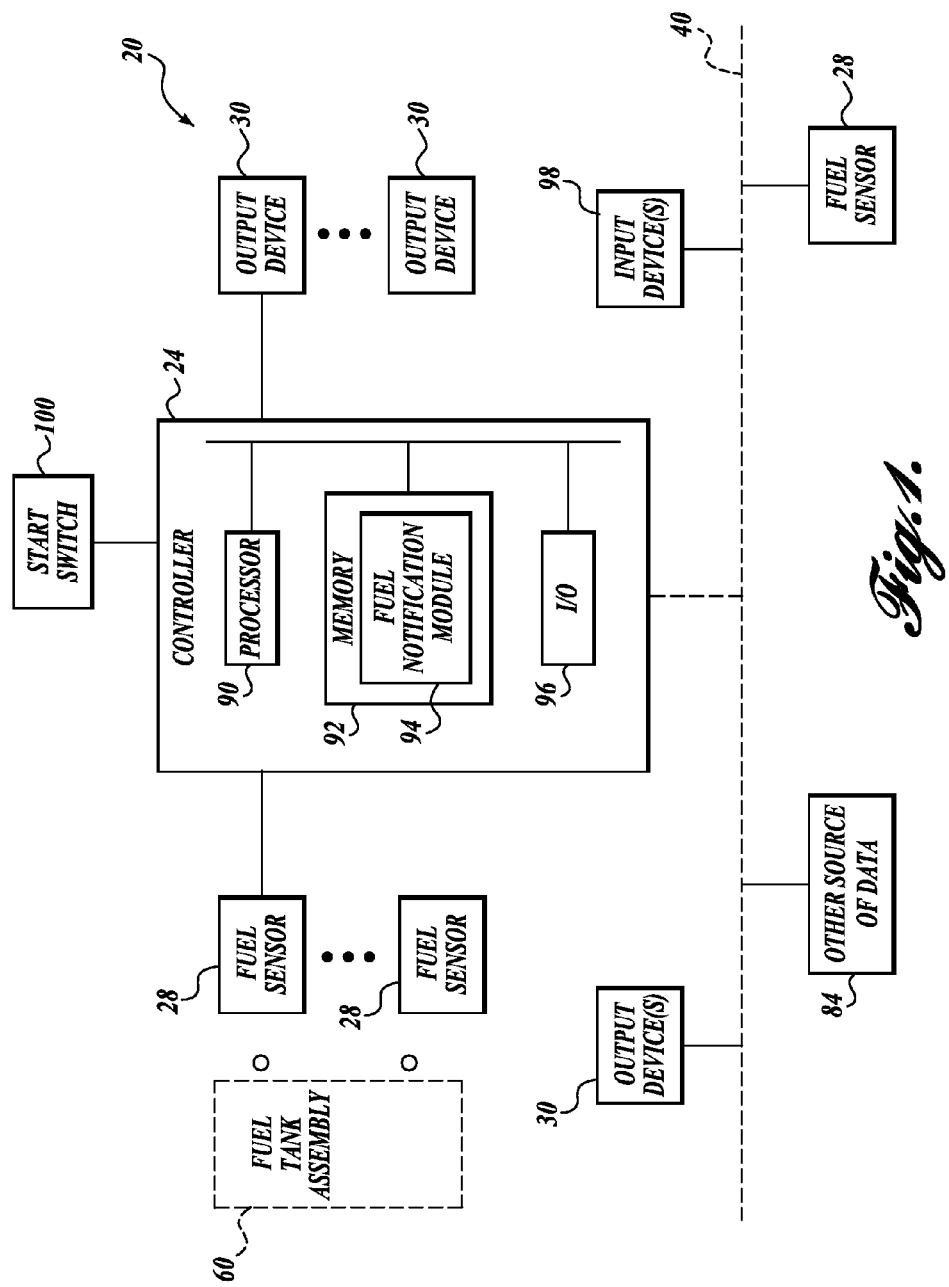
FIG. 1 is a block diagram of one example of a fuel notification system in accordance with aspects of the present disclosure.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

Prior to discussing the details of various aspects of the present disclosure, it should be understood that the following description includes sections that are presented largely in terms of logic and operations that may be performed by conventional electronic components. These electronic components may be grouped in a single location or distributed over a wide area. It will be appreciated by one skilled in the art that the logic described herein may be implemented in a variety of configurations, including but not limited to, hardware, software, and combinations thereof. In circumstances were the components are distributed, the components are accessible to each other via communication links.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. It will be appreciated that embodiments of the present disclosure may employ any combination of features described herein.

The following description sets forth one or more examples of a system that notifies the operator, during refueling, when the fuel tank of a vehicle has been filled to contain a predetermined amount. The predetermined amount may include but is not limited to a full condition, an amount that is calculated to satisfy a specific trip, etc. Examples of the system include one or more fuel sensors that can detect conditions of the fuel delivery system, such as the quantity of fuel residing in the tank. The system further includes a controller and an output device. As will be described in more detail below, the controller receives the data from the one or more sensors, processes the data, and causes the output device to notify the operator when the tank is filled with the predetermined amount of fuel. The notification can be audible, such as the horn honking, visual, such as lights flashing, or tactile, such as the vehicle seat vibrates.

Although exemplary embodiments of the present disclosure will be described hereinafter with reference to a heavy duty truck, it will be appreciated that aspects of the present disclosure have wide application, and therefore, may be suitable for use with many other types of vehicles, including but not limited to light and medium duty vehicles, passenger vehicles, motor homes, buses, commercial vehicles, marine vessels, etc. Accordingly, the following descriptions and illustrations herein should be considered illustrative in nature, and thus, not limiting the scope of the present invention, as claimed.

As briefly described above, embodiments of the present disclosure are directed to a system suitable for use in a vehicle that notifies the operator, during refueling, when the fuel tank of a vehicle has been filled to contain a predetermined amount. Turning now to FIG. 1, there is shown in block diagrammatic form one example of the fueling notification system, generally designated 20, formed in accordance with aspects of the present disclosure. As best shown in FIG. 1, the system 20 includes a controller 24 connected in electrical communication with one or more fuel sensors 28 and one or more output devices 30. In use, the controller 24 receives input signals from the one or more fuel sensors 28, processes these signals and/or others according to logic rules to be described in detail below, and transmits signals to the one or more output devices 30 in order to notify the operator of a condition. The condition may indicate a "full" tank of fuel, a predetermined quantity of fuel resides in the tank, a predetermined amount of fuel has been added to the tank, etc.

Each of the fuel sensors 28 generates a signal based on a physical measurement of a condition associated with the fuel tank 60 and the contents thereof. The condition may include but is not limited to weight of the fuel tank, the volume of fuel residing in the tank, the amount of fuel entering or exiting the tank, among others. In that regard, the one or more fuel sensors can be one sensor or group of sensors capable of generating signal(s) that are used by the controller to determine the quantity of fuel within the fuel tank. Examples of the one or more fuel sensors include but are not limited to fluid flow sensors, distance sensors, load sensors, resistive element sensors (of the type employed by conventional float-type fuel gauge sending units), etc. In some embodiments, the signals generated by the sensors comprise a time series of values. The generated signals are then either preprocessed and transmitted or transmitted without further processing to the controller 24.

Figure 2:
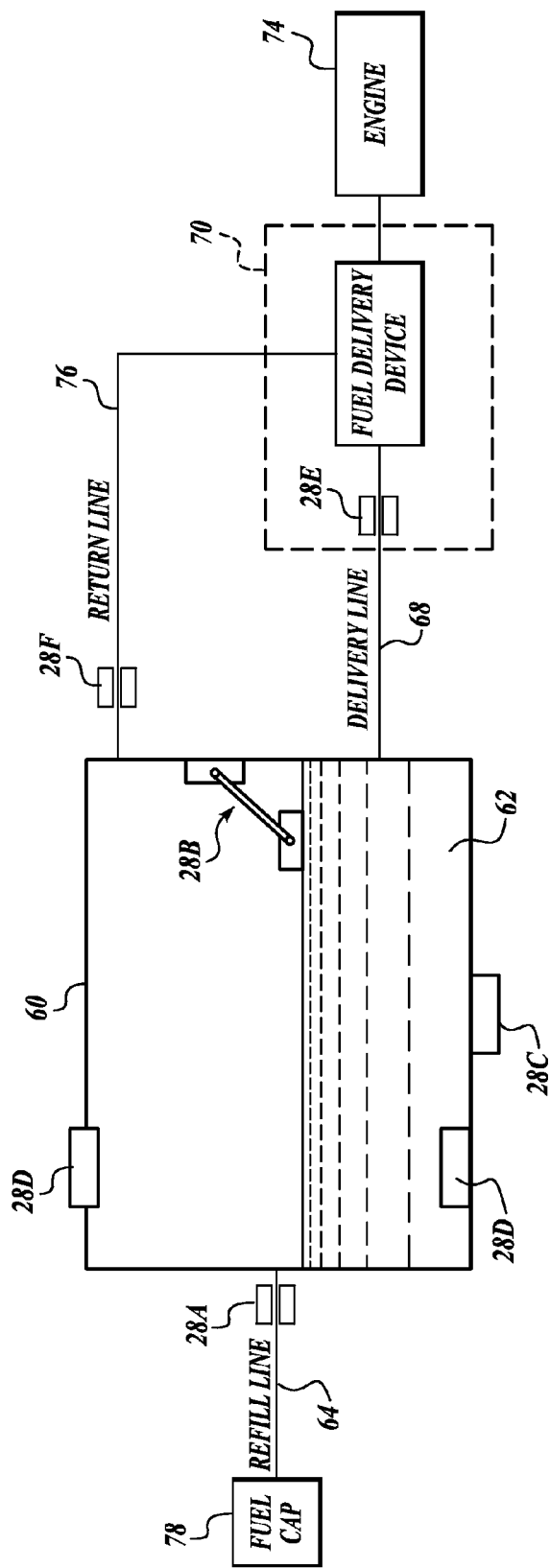
FIG. 2 is a schematic diagram of one or more sensors of the fuel notification system in association with a fuel tank of a vehicle.
Figure 3:
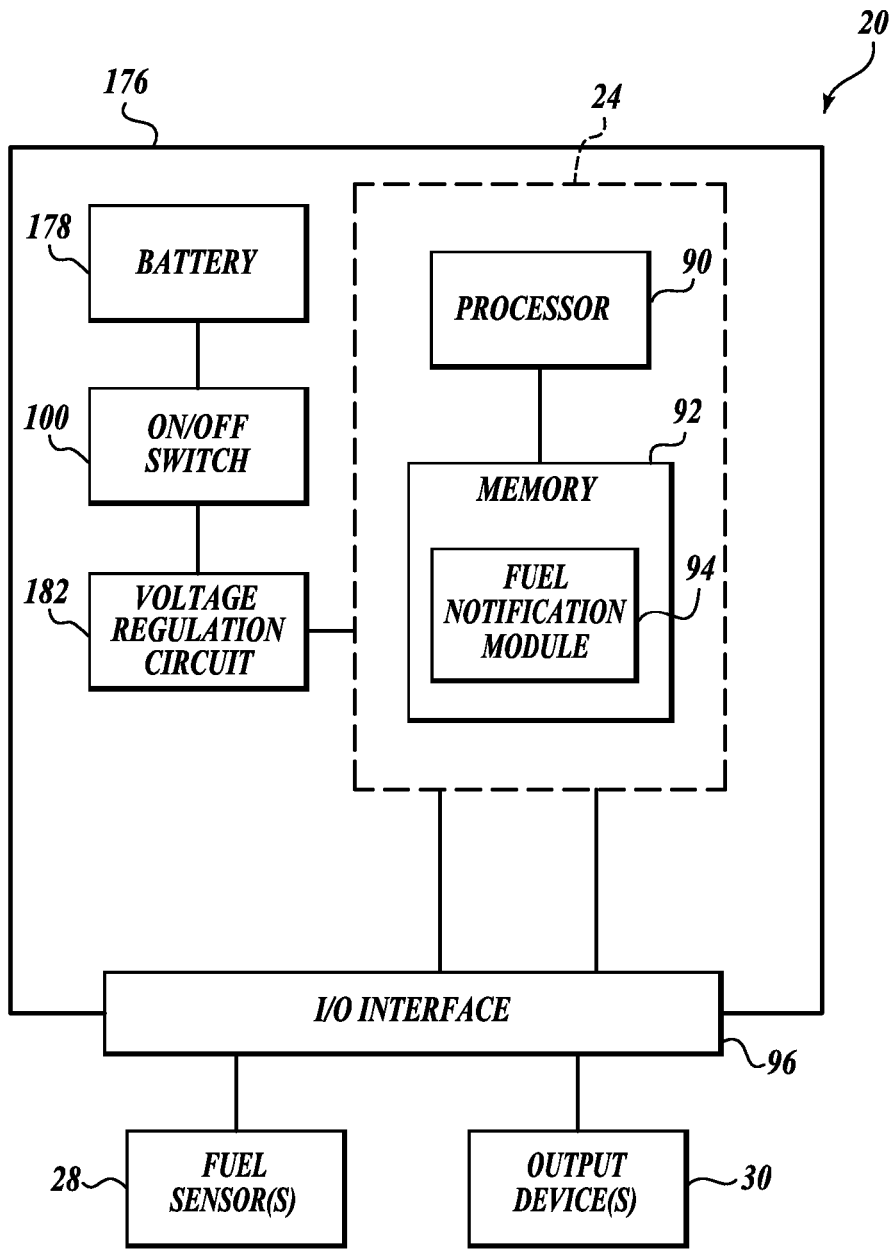
FIG. 3 is a block diagram of another example of a fuel notification system in accordance with aspects of the present disclosure.

FIG. 2 illustrates schematically one example of an environment in which the system operates. The environment includes a vehicle fuel tank 60 having a refill line 64 coupled thereto. In some embodiments, the refill line is formed by a short fill neck. Leading out from the fuel tank 60 is a fuel delivery line 68, which is part of a fuel delivery system 70 configured to provide fuel to an internal combustion engine 74. In one embodiment, a fuel return line 76 can be provided to route unused fuel back to the fuel tank 60. A fuel cap 78, lid, or the like can be proximal the end of the refill line 64.

As shown in FIG. 2, the one or more fuel sensors 28 can be located at various locations around the fuel tank 60 and/or the fuel delivery system 70. In the embodiment shown, the one or more fuel sensors 28 may include a fuel flow meter 28A disposed at the refill line 64. Additionally or alternatively, the one or more fuel sensors 28 may include a "float-type" sensor 28B positioned within the tank. Other fuel sensors may additionally or alternatively be used, such as load sensor 28C that is capable of measuring the weight of the tank, and/or a distance sensor 28D (employing ultrasound or the like) configured and arranged to generate a signal that represents the distance between the sensor and the surface of the fuel 62 in the fuel tank 60.

Examples of some of the fuel sensors 28 that may be practiced with embodiments the present disclosure are set forth in U.S. Pat. Nos. 6,691,025, 6,615,656, and 5,765,435, which are hereby expressly incorporated by reference. One type of fuel flow meter that may be practiced with embodiments of the present disclosure is commercially available from Floscan Instruments Co., Inc., Seattle, Wash. As will be described in more detail below, a computing device coupled to the one or more fuel sensors 28 is programmed to convert the generated fuel signals to a percentage of capacity signal, can calculate the volume (in gallons, liters, etc.) of fuel within the fuel tank, etc. It will be appreciated that one or more of the sensors 28 can be dedicated to the system 20 or may be part of other vehicle systems as described in detail below, such as the fuel delivery system of the vehicle, a float-type sending unit of a vehicle fuel gauge, etc.

Returning to FIG. 1, the controller 24 can be connected directly (wired or wirelessly) to the one or more sensors 28 or indirectly via a CAN 40. Those skilled in the art and others will recognize that the CAN 40 may be implemented using any number of different communication protocols such as, but not limited to, Society of Automotive Engineer's ("SAE") J1587, SAE J1922, SAE J1939, SAE J1708, and combinations thereof.

The controller 24 may also communicate with other electronic components of the vehicle either directly or via the CAN 40 for collecting data associated with fuel levels in the fuel tank 60. For example, the controller 24 may receive data from other sources of data, designated 84, which can be an engine controller configured to monitor and/or calculate fuel efficiency of the vehicle. In that regard, in one embodiment, one or more fuel flow meters, such as sensor 28E, associated with the fuel delivery system 70 of the vehicle can be configured to sense the amount of fuel delivered to the engine 74 for combustion via the delivery line 68. Data collected by the one or more fuel flow meters can be stored in the engine controller. In vehicles that employ a common rail delivery system that incorporates a fuel return, some embodiments may optionally include additionally fuel flow meters, such as sensor 28F, that sense the amount of fuel returning to the fuel tank 60 via the return line 76. Additionally or alternatively, the controller 24 may receive data from a float-type sensor of the fuel gauge system, which is outputted to the operator via a fuel gauge or the like.

In several embodiments, the controller 24 may contain logic rules implemented in a variety of combinations of hardware circuitry components and programmed microprocessors to carry out the functionality of the system. To that end, as further illustrated in FIG. 1, one suitable embodiment of the controller 24 includes a processor 90, memory 92, and a fuel notification module 94 stored on the memory 92. The memory 92 may include computer readable storage media in read-only memory (ROM), random-access memory (RAM), and keep-alive memory (KAM), for example. The KAM may be used to store various operating variables or program instructions while the processor 90 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, including fuel data. In some embodiments, the controller 24 may include additional components including but not limited to a high speed clock, analog to digital (A/D) and digital to analog (D/A) circuitry, input/output circuitry and devices (I/O 96) and appropriate signal conditioning and buffer circuitry.

As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. Therefore, as used herein, the term "controlling component" can be used to generally describe these aforementioned components, and can be either hardware or software, or combinations thereof, that implement logic for carrying out various aspects of the present disclosure.

In some embodiments, the processor 90 executes instructions stored in memory 92, such as fuel notification module 94. The fuel notification module 94 may include a set of control algorithms, including resident program instructions and calibrations stored in one of the storage mediums and executed to provide desired functions. Information transfer to and from the fuel notification module 94 can be accomplished by way of a direct connection, a local area network bus and a serial peripheral interface bus. The algorithms may be executed during preset loop cycles such that each algorithm is executed at least once each loop cycle. Algorithms stored in the non-volatile memory devices are executed by the processor to monitor inputs from the sensing devices and other data transmitting devices or polls such devices for data to be used therein. Loop cycles are executed at regular intervals, for example each 3.125, 6.25, 12.5, 25 and 100 milliseconds during ongoing operation of the vehicle. Alternatively, algorithms may be executed in response to the occurrence of an event.

The set of instructions provided by the fuel notification module 94, when executed by the processor 90, carries out the following functionality: 1) calculates the amount of fuel present in the fuel tank during refueling; and 2) determines whether a notification is outputted to the user based on this calculation. As will be described in more detail below, the controller 24 may determine fuel quantity during refueling in a variety of ways. In some embodiments, the calculated fuel quantity during refueling is compared to a "full value" stored in memory. When greater than the "full value", the controller 24 causes a notification to the user. In other embodiments, the calculated fuel quantity is compared to a predetermined value stored in memory 92. The predetermined value can be received as input from the operator for notification after a predetermined amount of fuel resides in the tank (e.g., 60 gallons, 140 gallons, etc.), or can be calculated based on vehicle trip data. For example, the predetermined value in some embodiments may represent the amount of fuel needed to reach a particular destination, and in some embodiments, can be determined via an intelligent vehicle monitoring system that uses GPS data, vehicle type data (engine type, vehicle weight, etc.), etc. In this embodiment, the input can be realized via input devices 98 of the vehicle, such as the infotainment system, or can be entered by a dedicated input device, such as a keyboard, touch screen, touch pad, etc.

Still referring to FIG. 1, the processor 90 in some embodiments communicates with the one or more sensors 28 and various other data sources 84 directly or indirectly via an input/output (I/O) interface 96 and suitable communication links. The interface 96 may be implemented as a single integrated interface that provides various raw data or signal conditioning, processing, and/or conversion, short-circuit protection, and/or the like. Alternatively, one or more dedicated hardware or firmware chips may be used to condition and process particular signals before being supplied to the processor 90. In some embodiments, the signals transmitted from the interface 96 may be suitable digital or analog signals to control an output device.

The system 20 further includes any of a number of output devices 30, such as visual output devices (e.g., lights, displays, gauges), audible output devices (e.g., speakers, etc.) and haptic feedback devices, such as vibration generators. The output device 30 may be stand alone, integrated with the instrument panel of the vehicle, with a rear view mirror or a side view mirror, mounted in, on or over a portion of the vehicle body, such as the hood, fuel tank lid, etc., and/or located and/or integrated with any other suitable structure in the vehicle. In use, when the controller 24, in response to data obtained by the one or more fuels sensors 28, etc., determines that the quantity of fuel residing in the tank is greater to or equal than a predetermined value, the controller 24 causes one or more of the output devices 30 to broadcast an alert notification signal to the user. For example, the controller 24 may cause the horn to honk, one or more of the vehicle lights to flash, the driver or passenger seat to vibrate, an external speaker to sound, among others.

As shown in FIG. 1, the controller 24 is a dedicated controller. However, it will be appreciated that the controller 24 may be a module, which could be software embedded within an existing on-board controller, such as the engine controller, a general purpose controller, etc.

Figure 4:
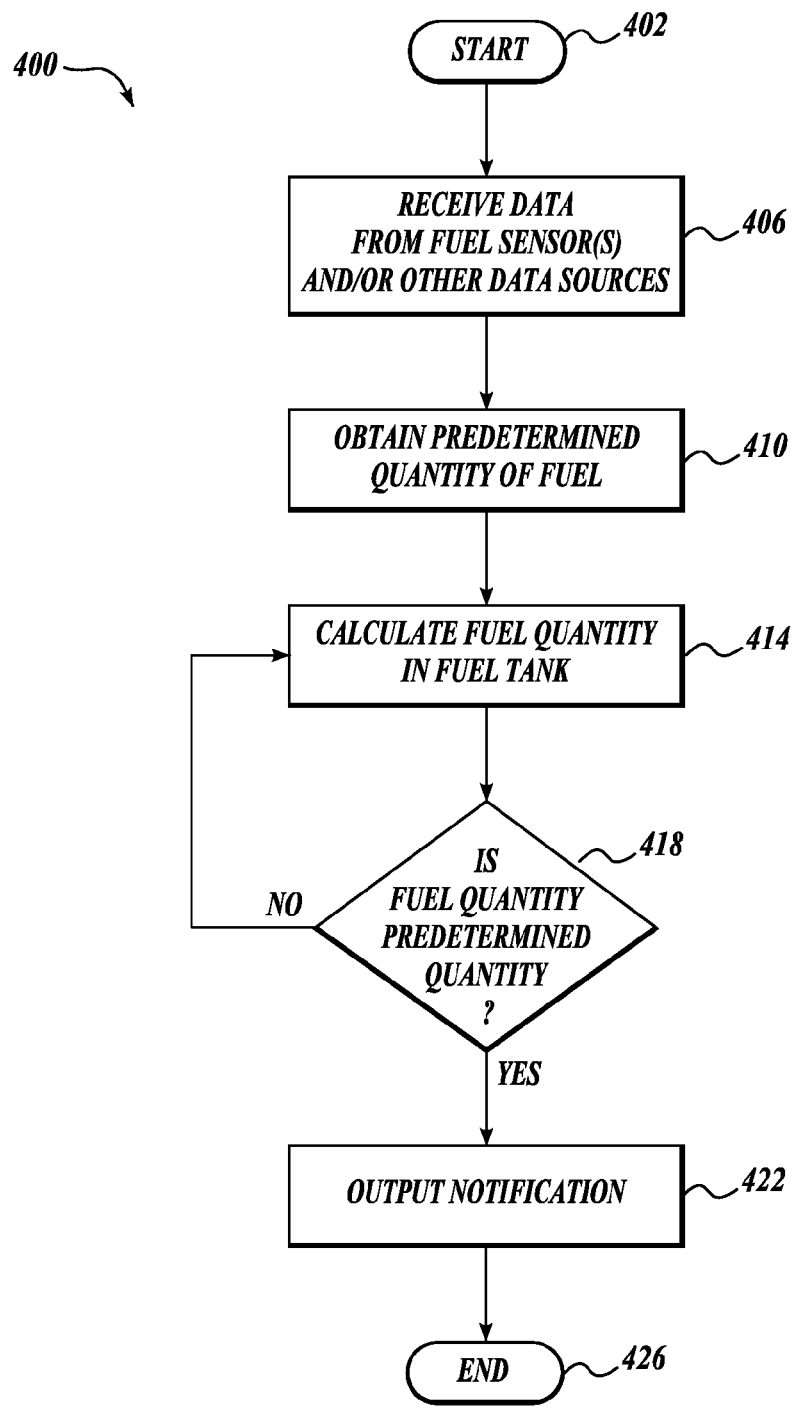
FIG. 4 is a flow diagram of one example method for notifying a user of a condition during refueling of a vehicle.

Referring now to FIG. 4, there is shown a flow diagram of one example of method 400 carried out by the fuel notification module 80, when executed by the processor 68. As shown in FIG. 4, the method begins at block 402. In this regard, the fuel notification module 94 may be loaded from, for example, the EEPROM into the RAM via a signal from a start switch 100. In some embodiments, the start switch 100 is an on/off toggle or push button switch that is manually activated by the operator just prior to refilling the fuel tank 60. In other embodiments, the start switch 100 may include a sensor that outputs an activation signal upon an event associated with refilling, such as removing the fuel cap 78, fuel flowing through fill neck as sensed by flow meter 28A, etc.

Next, at block 406, one or more signals from the one or more fuel sensors 28 are received by the controller 24. Other data may also be received, such as from the other data sources 84, including data from the engine controller, data from the fuel delivery system 70, etc. The controller 24 can passively receives or actively retrieves data from one or more sensors, etc. From block 406, the method proceeds to block 410, where a value indicated of a predetermined quantity of fuel is obtained. In some embodiments, the predetermined quantity is indicative of a "full" tank. In other embodiments, the predetermined quantity is indicative of a percentage of a "full" tank, such as 95%, 90%, 85%, and so on. In yet other embodiments, the predetermined quantity is a certain number of gallons (or liters) of fuel. Thus number can be inputted by the operator prior to refill, or can be calculated by a smart navigation device. For example, as briefly described above, the predetermined value in some embodiments may represent the amount of fuel needed to reach a particular destination, and in some embodiments, can be determined via an intelligent vehicle monitoring system using GPS data, vehicle type data (engine type, vehicle weight, etc.), and/or the like.

Next, at block 414, the data from the one or more sensors 28 and/or other data sources 84 can be processed according to one or more algorithms, and a determination regarding one or more conditions of the fuel tank can be made. For example, at block 414, the amount of fuel 62 in the fuel tank 60 can be continuously calculated as fuel is added via the refill line 64 to the fuel tank 60 during refueling. In some embodiments, the calculation includes a determination of the "start" quantity of fuel and sums the amount of fuel added to the fuel tank during the refill to this start value. The start quantity can be determined in a number of ways. The determination may be based on the input of one sensor 28 or a combination of sensors 28. In some embodiments, the data from each source can be weighted based, for example, on the accuracy of each data source. In other embodiments, the primary determination of the value is made by one sensor, while data from one or more other sources can be used to either verify or optimize the determination.

In some embodiments, the start quantity can be determined from the distance sensor 28D, the float-type sensor 28B, the load sensor 28C, etc., or combinations thereof. In other embodiments, the start value can be obtained from previous calculations stored in memory 92. These calculations may have been carried out by the fuel delivery system, the fuel gauge system, the system 20, or combinations thereof.

Similarly, the quantity of fuel added during the refill can be determined in a number of ways, including from load sensor 28C, fuel flow meter 28A, distance sensor 28D, float sensor 28B, etc., or combinations thereof. In one embodiment, the quantity of fuel added to the tank 60 is determined via the fuel flow meter 28A. In other embodiments, the quantity of fuel added is determined via the fuel flow meter 28A, and either verified or augmented as desired, by the data from a the load sensor 28C, the float sensor 28B, the distance sensor 28D, etc., and combinations thereof.

As the amount of fuel residing in the tank is continuously being determined, the value representing the quantity of fuel in the fuel tank is compared to the predetermined quantity at block 418. If less than the predetermined quantity, the method returns to block 414. If greater than or equal to the predetermined quantity, then the method proceeds to block 422, where an output device outputs a notification signal indicative of the condition of the fuel tank. For example, if it was determined that the fuel quantity residing in the fuel tank is greater than a predetermined amount, then the controller causes the output device 30 to output a notification signal. The notification signal can be a honk of the vehicle horn, flashing of one or more of the vehicle lights, such as the running lights, the head lights, etc., a vibration of the driver or passenger seat, or an alert broadcasted by a speaker, etc. After the notification is outputted, the method ends at block 426.

It will be appreciated that the method 400 can also provide notifications to the user upon a condition that is less than the predetermined amount, but provides the user information regarding the refill. For example, a notification can be outputted that the quantity determined is 50%, 75%, 90%, etc., of the predetermined amount. It will be appreciated that the controller 24 can sequentially use different output devices 30 to provide the notification of these or other suitable or desirable levels or percentages of the preselected value. Alternatively, frequencies of output signals of one output device, such as the flashing of a light, can vary to convey this information. Other techniques of using audible, visual, and/or haptic feedback can also be used to convey these or other conditions.

In one embodiment, the system 20 may be configured as a dedicated unit that is sized to be mounted on or adjacent a fuel tank of a vehicle, and powered by one or more batteries 178 (e.g., 6-12 VDC). In that regard, the system may include the controller 24 having a protective housing 176 that envelops the electrical circuitry thereof. The housing 176 can be constructed of any suitable lightweight but durable material, such a plastic. The housing 176 may support one or more input connectors for coupling with one or more of the fuel sensors 28 associated with the fuel tank, etc. Output devices 30, such as a light and/or speaker, can be mounted to the housing 176 or located in proximity thereof for notifying the user upon a condition. To supply power from the one or more batteries 178 to the circuitry and/or output devices, the system 20 may further include an on/off switch 100 and a voltage regulation circuit 182. In one embodiment, the voltage regulation circuit 182 and the controller circuitry may be mounted on a circuit board housed within the housing 176. In other embodiments, the system 20 may receive power from the vehicle power system. The on/off switch 100 in some embodiments can be activated by the user prior to fill up, or can be automatically triggered via an external trigger, such as a motion sensor associated with the fuel cap, etc.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A system for notifying a user of a condition during refueling of a vehicle, comprising:
    an output device configured to produce a user notification;
    a fuel reservoir;
    a memory having stored therein a start quantity of fuel in the fuel reservoir, a full quantity of fuel in the fuel reservoir, and a user-selectable quantity of fuel in the fuel reservoir;
    one or more sensors associated with the fuel reservoir, wherein the one or more sensors are configured to generate data indicative of a cumulative quantity of fuel added to the fuel reservoir; and
    a controller configured to receive the data from the one or more sensors during refill of the fuel reservoir, add the cumulative quantity to the start quantity to determine a total quantity of fuel in the fuel reservoir, compare the total quantity of fuel in the fuel reservoir with the full quantity of fuel in the fuel reservoir or the user-selectable quantity of fuel in the fuel reservoir, and cause the output device to produce the user notification when the total quantity of fuel in the fuel reservoir has exceeded either the full quantity of fuel in the fuel reservoir or the user-selectable quantity of fuel in the fuel reservoir.

2. The system of claim 1, wherein the output device generates one of an audible notification, a visual notification, and a haptic notification.

3. The system of claim 1, wherein the data indicates one or more conditions selected from the group consisting of fuel volume, fuel weight, and fuel level.

4. The system of claim 1, wherein the user-selectable quantity of fuel in the fuel reservoir is less than a quantity representing a full fuel reservoir.

5. The system of claim 1, wherein the user-selectable quantity of fuel represents a quantity of fuel required to reach a selected destination.

6. The system of claim 1, further comprising a start switch.

7. The system of claim 6, wherein the start switch is a user operated switch.

8. The system of claim 6, wherein the start switch is activated by a signal generated by one of the one or more sensors.

9. The system of claim 6, wherein the start switch is activated by a signal generated by a sensor independent of the one or more sensors.

10. A method for notifying a user of a condition during refueling of a vehicle, comprising:

storing, in a memory, values indicating a start quantity of fuel in a fuel tank, a full quantity of fuel in the fuel tank, and a user-selectable quantity of fuel in the fuel tank;

receiving data indicative of a fuel level in the fuel tank from one or more sensors;

obtaining, from the memory, the values indicating the full quantity of fuel in the fuel tank and the user-selectable quantity of fuel in the fuel tank;

determining a cumulative quantity of fuel added to the fuel tank during refueling from the one or more sensors;

determining a total quantity of fuel in the fuel tank during refueling by adding the cumulative quantity of fuel to the start quantity of fuel;

comparing the total quantity of fuel in the fuel tank with the full quantity of fuel in the fuel tank or the user-selectable quantity of fuel in the fuel tank; and outputting a notification signal in response to the total quantity of fuel in the fuel tank being equal to or greater than the full quantity of fuel in the fuel tank or the user-selectable quantity of fuel in the fuel tank.

11. The method of claim 10, wherein the notification signal is one of an audible signal, a visual signal, and a haptic signal.

12. The method of claim 10, wherein the data is generated from one or more sensors selected from a group consisting of a load sensor, a fuel flow meter, a float sensor, and a distance sensor.

13. The method of claim 10, wherein the user-selectable quantity of fuel in the fuel tank represents a minimum quantity of fuel needed to reach a destination.

14. The method of claim 10, wherein the user-selectable quantity of fuel in the fuel tank is less than a quantity representing a full tank.

15. The method of claim 10, wherein determining the quantity of fuel in the fuel tank during refueling includes:

determining a quantity of fuel added to the fuel tank during refueling; and adding to the quantity of fuel added to the fuel tank during refueling the start quantity of fuel in the fuel tank.

\* \* \* \* \*

UNITED STATES PATENT AND TRADEMARK OFFICE
CERTIFICATE OF CORRECTION

Page 1 of 1

PATENT NO.        : 8,928,469 B2
APPLICATION NO.   : 13/834699
DATED             : January 6, 2015
INVENTOR(S)       : Scott Newhouse It is certified that error appears in the above-identified patent and that said Letters Patent is hereby corrected as shown below:

In the Specification

Column 1, Paragraph 2: At the end of the sentence insert new paragraph:
--This invention was made with Government support under "Recovery Act - System Level Demonstration of Highly Efficient and Clean, Diesel Powered Class 8 Trucks (Supertruck)," Program Award Number DE-EE0003403 awarded by The Department of Energy (DOE). The Government has certain rights in this invention.--

Signed and Sealed this
Sixth Day of August, 2019

Andrei Iancu
*Director of the United States Patent and Trademark Office*